United States Patent [19]

Barr et al.

[11] Patent Number: 5,761,442

[45] Date of Patent: Jun. 2, 1998

[54] PREDICTIVE NEURAL NETWORK MEANS AND METHOD FOR SELECTING A PORTFOLIO OF SECURITIES WHEREIN EACH NETWORK HAS BEEN TRAINED USING DATA RELATING TO A CORRESPONDING SECURITY

[75] Inventors: Dean S. Barr, Safety Harbor; Ganesh Mani, Clearwater Beach, both of Fla.

[73] Assignee: Advanced Investment Technology, Inc., Clearwater, Fla.

[21] Appl. No.: 298,905

[22] Filed: Aug. 31, 1994

[51] Int. Cl.$^6$ ............................................. H01J 1/00
[52] U.S. Cl. ........................................ 395/236; 395/235
[58] Field of Search ................................. 395/235, 236, 395/22, 925

[56] References Cited

U.S. PATENT DOCUMENTS

| | | | |
|---|---|---|---|
| 4,597,046 | 6/1986 | Musmanno et al. | 364/408 |
| 4,858,147 | 8/1989 | Conwell | 364/513 |
| 5,077,677 | 12/1991 | Murphy et al. | 395/10 |
| 5,109,475 | 4/1992 | Kosaka et al. | 395/22 |
| 5,119,469 | 6/1992 | Alkon et al. | 395/23 |
| 5,245,533 | 9/1993 | Marshall | 364/401 |
| 5,250,766 | 10/1993 | Hikita et al. | 187/133 |
| 5,267,148 | 11/1993 | Kosaka et al. | 364/408 |

FOREIGN PATENT DOCUMENTS 2 253 081   8/1992   United Kingdom .

OTHER PUBLICATIONS

Ankrim, Ernest et al., Multicurrency Performance Attribution, Financial Analysts Journal, pp. 1–1–14 (renumbered by examiner), Mar. 1994.

Morningstar, Inc. User's Guide to Morningstar Mutual Funds, pp. 11–12, 13–16, 22–24 and 41–43, Apr. 29, 1994.

NeuroForecaster, "The NeuroForecaster® Way to Analyze, Classify and Forecast," A Professional Business Forecasting Tool Guide, Singapore, 1993.

David E. Rumelhart, James L. McClelland, "Parallel Distributed Processing Explorations in the Microstructure of Cognition vol. 1: Foundations," Chapter 8, the MIT Press, Cambridge, Massachusetts, 1987.

NeuroShell® 2 Users Manual, Ward Systems Group, Inc., Chapter 5, pp. 123–143, 1993.

Fishman, Mark B., Barr, Dean S., Heavner, Ellen, "A New Perspective on Conflict Resolution in Market Forecasting," IEEE Computer Society Press Reprint from Proc. of The First International Conference On Artificial Intelligence Applications On Wall Street, pp. 97–102, New York, Oct. 9–11, 1991.

Fishman, Mark B., Deans S. Barr and Walter J. Loick, "Using Neural Nets in Market Analysis", reprinted from Technical Analysis of Stocks & Commodities™ magazine, 1991.

Barr, Dean S., Mani, Ganesh, "Neural Nets in Investment Management: Multiple Users," Software Engineering Press, 1993.

*Primary Examiner*—Tommy P. Chin
*Assistant Examiner*—David R. Vincent
*Attorney, Agent, or Firm*—Pennie & Edmonds LLP

[57] ABSTRACT

A data processing system and method for selecting securities and constructing an investment portfolio is based on a set of artificial neural networks which are designed to model and track the performance of each security in a given capital market and output a parameter which is related to the expected risk adjusted return for the security. Each artificial neural network is trained using a number of fundamental and price and volume history input parameters about the security and the underlying index. The system combines the expected return/appreciation potential data for each security via an optimization process to construct an investment portfolio which satisfies predetermined aggregate statistics. The data processing system receives input from the capital market and periodically evaluates the performance of the investment portfolio, rebalancing it whenever necessary to correct performance degradations.

23 Claims, 7 Drawing Sheets

PREDICTIVE NEURAL NETWORK MEANS AND METHOD FOR SELECTING A PORTFOLIO OF SECURITIES WHEREIN EACH NETWORK HAS BEEN TRAINED USING DATA RELATING TO A CORRESPONDING SECURITY

FIELD OF INVENTION

The present invention relates to a financial data processing system and method designed for investors whose objective is to obtain a return on their investment portfolio which is superior to the broad index benchmarks of a given capital market. More particularly, the system and method of this invention are preferably carried out using artificial neural networks capable of estimating the appreciation potential of the individual securities in a capital market. The system of this invention uses the appreciation estimates for the individual securities to create and administer investment portfolios with varying time horizons.

BACKGROUND OF THE INVENTION

Individual and institutional investors apply various selection and optimization strategies in the process of creating a securities portfolio which can provide higher return on their capital investment. Such strategies are frequently based on research in a particular industry, historical price data for individual stocks, analysis of fundamental data, etc. A common problem in formulating an investment strategy is, however, the overwhelming amount of the available market information which cannot be readily interpreted. For this reason, investors are confined to specific techniques which rely on limited subsets of data.

For example, many investors employ a technique known as market timing, which involves investing in the equity markets at the perceived time of market growth and divesting at a later time of perceived market contraction. This strategy is usually based on timing the cycles for the market as a whole which tends to avoid the risk associated with owning individual stocks. A problem with this approach is that accurate timing of the market cycles involves, by necessity, the compression of large amounts of statistical data into analytical worksheets, graphs, bar charts or other quantitative depictions of the information so as to enable a skilled analyst to make an investment decision. Unfortunately, the compression process may obscure relevant trends in smaller subsets of data. Further problems arise if it is desired to follow the performance of foreign markets because additional information such as currency exchange rates has to be taken into account.

The advent of computerized trading and other forms of advanced information processing in recent years has created a new family of global investment products, such as commodity options; real estate and currency funds; financial futures contracts and other derivative instruments based on the underlying securities. Also, investment vehicles have been offered to track the performance of select foreign markets. A problem common to all these investment products is that in order to obtain desirable return rates, it is required to use specialized knowledge in the respective investment fields.

Among the various investment options, mutual funds which offer a variety of investment options tailored to specific customer needs have gained popularity in last few years. One such option is presented by the so-called indexed stock funds which are designed to track the performance of broader market benchmarks, such as the S&P (Standard & Poor's) 500 index. The S&P 500 index is a market capitalization weighted basket of the stocks of 500 large companies, indicative of the performance of the U.S. equity markets. The indexed stock funds usually invest in the stocks of the S&P 500 companies targeting their relative weights in the index and, therefore, directly track the performance of the S&P 500 index, aided by lower asset research fees and transaction costs. Such financial products offer convenience and relatively low fees but are meant to follow and match the market, not outperform it.

If the investment goal is to surpass the underlying market benchmark, the task becomes one of holding a smaller subset of all stocks of the market, such that this subset has a higher expected return and about the same level of risk as the market index. Such task requires one to focus on individual stocks and their performance in relation to the index that serves as the underlying performance benchmark. Individual stocks usually have their own unique performance characteristics. Information that is specific to a particular stock includes earnings-related data, the company's growth plans, personnel changes and the public's perception of the company. While some of these factors (such as personnel) are not readily quantifiable, others such as earnings and projections (e.g., earnings estimates and their revisions) can be quantified. Clearly, however, the relationships among such data are complicated and frequently non-linear, making them difficult to analyze. In summary, an investment decision in the modern capital markets requires processing of large volumes of data and taking into account a number of factors which may exhibit significant non-linear relationships among different components of the data.

Computers, in general, are very adept at dealing with large amounts of numerical information. However, sophisticated techniques are required to analyze and combine disparate information that can potentially impact security prices. Several expert computer systems have been deployed in the domain of finance, including some in the area of investment management.

In the past several years, neural networks ("neural nets") have become popular in solving a variety of problems ranging from protein secondary structure prediction to speech recognition. Neural nets mimic the ability of the human brain to recognize recurring patterns that are not just identical but similar. A neural net can predict the value of one variable based on input from several other variables that can impact it. The prediction is made on the basis of an inventory of patterns previously learned, seeking the most relevant in a particular situation. Unlike traditional Artificial Intelligence (AI) systems, which are rule-based, neural nets can "learn" by example and modify themselves adjusting and adapting to changing conditions.

Several applications of neural nets to the domain of finance are already known in the art.

U.S. Pat. No. 5,109,475 to Kosaka et al. discloses a neural network for selection of time series data. This method is illustrated in a particular application to the problem of stock portfolio selection. In the first step of the proposed method, certain characteristics for each security are calculated from a time series data related to the security. The characteristics to be computed include the historical risk (variance and co-variance) and the return. The following step involves the establishment of a performance function based on the calculated characteristics and, in the third step of the method, a Hopfield neural network is used to select a subset of securities from a predefined universe. Due to the fact that the Kosaka system only considers historical risk and return data, and implicitly assumes that the relationship between risk and return factors will remain stable in the future, in a typical rapidly changing market environment, it is unlikely to predict accurately price variations which are subject to complicated non-linear relationships.

U.K Pat. application 2 253 081 A to Hatano et al. discloses a neural net for stock selection using only price data as input. The main idea of the proposed system is to calculate runs (sequences) of price trends, increases and decreases, using a point-and-figure chart and using the maximum and minimum values from the chart to make a time-series prediction using a neural network. As in the previous case, the Hatano system only uses historic price data which places limitation on the type and quality of predictions that may be achieved. Additionally, the use of only the external points of the price chart obscures even further information about any time dependencies that might be present in the original data.

The above-described financial systems do not fully utilize the potential of the neural nets for stock selection and optimized portfolio construction. Notably missing is the capability to take into account a combination of technical (historical price, volume, etc.) and fundamental factors (earnings, cashflow, etc.) for each security in a capital market. Investment management systems known in the art have not been able to effectively combine technical and fundamental information in a computerized framework involving data processing systems and communication networks.

SUMMARY OF THE INVENTION

It is accordingly an object of the present invention to provide a data processing system to develop and administer an investment portfolio expected to outperform, if possible, broad indices associated with domestic or foreign capital markets.

It is another object of the present invention to present an artificial neural network system for estimating the appreciation potential of each security in a capital market using both fundamental and technical information about the security.

It is yet another object of the present invention to develop a method for stock selection on the basis of appreciation potential parameters estimated using a neural network system for each stock in a given capital market.

Yet another object of the present invention is to provide a data processing system and method to create an investment portfolio subject to certain risk parameters and to rebalance the portfolio periodically to increase the expected return of the portfolio while maintaining the investment risk at a similar level.

These and other objectives are achieved in accordance with the present invention using neural networks which can be trained to make predictions of the relative performance of a stock over a predetermined period of time vis-a-vis the risk adjusted return of the corresponding market index. The use of neural nets is particularly well suited to the problem of investment decision-making because it provides the capability to capture non-linear functional relationships among input variables which are not easily modeled or captured by more traditional methods of security analysis and selection, such as multifactor models based on linear regression.

Specifically, in the preferred embodiment, each stock in the capital market is tracked by an individual neural net which receives input signals representing both fundamental and technical information about the stock. Fundamental information includes earnings-related data about the stock while technical information includes price-derived data about the stock and the various market indices. The fundamental and technical information about each stock, appropriately organized, is used as a predictor or indicator of the future performance of the stock. (For example, one such indicator is the volatility of the stock returns over a select period of time). The neural net is input a set of indicators corresponding to a snapshot in time. Each of these indicators is derived using a lookback period, thus encoding a memory effect for each input. The network is trained using different sets of inputs (and corresponding outputs), tested on two different sets of data (termed test set and validation set) and then used to make forecasts using current market data. The type of indicators and the process of selecting values to be used as input data to the neural nets are determined by factors such as how far ahead the system is forecasting (its time horizon), the presence of periodicities in the data and the correlation between the indicator and the performance of the stock, the indices of the capital market, etc.

Following the selection of input indicators, each neural net is trained with the available historical data. The training process continues until at least one stopping criterion is met. Such criteria include the determination that the connections between the nodes of the net have reached a steady state, that the error between the predicted output and the actual target values is less than a certain threshold, or that a predefined time period has elapsed without any improvement in the net's performance. Once the neural nets for each stock of the capital market have been trained and tested on the available historical data, in accordance with the preferred embodiment of the present invention, the neural nets are used to make a prediction of the appreciation potential of each stock.

In a suitable time interval, such as one week, the appreciation potentials of the stocks in the capital market are recomputed and the neural nets are trained again using the historical data plus the newly available data. Each week the trained networks estimate the appreciation potential of the stocks 1, 2, . . . , M weeks ahead, so that comparing earlier overlapping estimates to available data about the stocks can provide a measure of how good each appreciation estimate is.

The system of the present invention correspondingly comprises means for choosing the appropriate input data which consists of a set of price-derived indicators as well as earnings-based rankings; means for pre-processing the data into appropriate categories and inputs; means for training the neural networks; means for determining the end of the training process; and means for accessing the appropriate data and making predictions for a given time period.

The appreciation potential of each stock determined by the neural nets is used to generate an optimized investment portfolio comprising a selected number of stocks. Each stock is allocated a weight based on its estimated performance potential within the prescribed future time period and other parameters related to the investment risk. These weights form the basis of both long and short portfolios. The "long" portfolio includes a prespecified number of stocks which are estimated to have the best appreciation potential. Conversely, the "short" portfolio includes stocks which are estimated to have the worst performance potential for the predetermined time period. An investor utilizing the system of the present invention may then make investment decisions (such as buying or selling stocks) on the basis of the suggested model portfolios.

More specifically, the portfolio of stocks is created in accordance with the present invention using a portfolio optimizer which employs the performance potentials estimated by the neural nets, a measure of how good the estimates are. forecasts of economic and financial variables, risk allocation factors. investor preferences and guidelines, and other factors. This optimizer is designed to suggest a portfolio of stocks which is expected to have similar risk as the overall capital market (or risk according to the investor's preference), but to outperform the investment return of the associated market benchmarks over a predetermined period of time.

The method and system of the present invention further provide continuous monitoring of the actual performance of the stocks of the capital market and comparison of this performance to the estimates obtained from the neural nets. Should a discrepancy between the estimated and the actual return larger than a predetermined threshold be detected, the system can rebalance the composition of the determined model portfolio, so that the investors using the system can adjust their positions in the capital market. Similarly, the portfolio can be rebalanced if the neural nets indicate different stocks with significantly higher or lower appreciation potentials (based on newer data) over the relevant time period.

The method and system of the present invention provide an effective and efficient tool for optimizing investment decisions by utilizing the capability of neural nets to take into account complex relationships among different market and stock-specific factors. The method and system further incorporate data processing optimization techniques that use the performance estimates for each stock obtained from the neural nets to construct portfolios that improve the returns on capital investments.

BRIEF DESCRIPTION OF THE DRAWINGS

The foregoing features of the present invention may be more fully understood from the following detailed disclosure of a specific preferred embodiment in conjunction with the accompanying drawings, in which.

DETAILED DESCRIPTION OF THE PREFERRED EMBODIMENT

Figure 1:
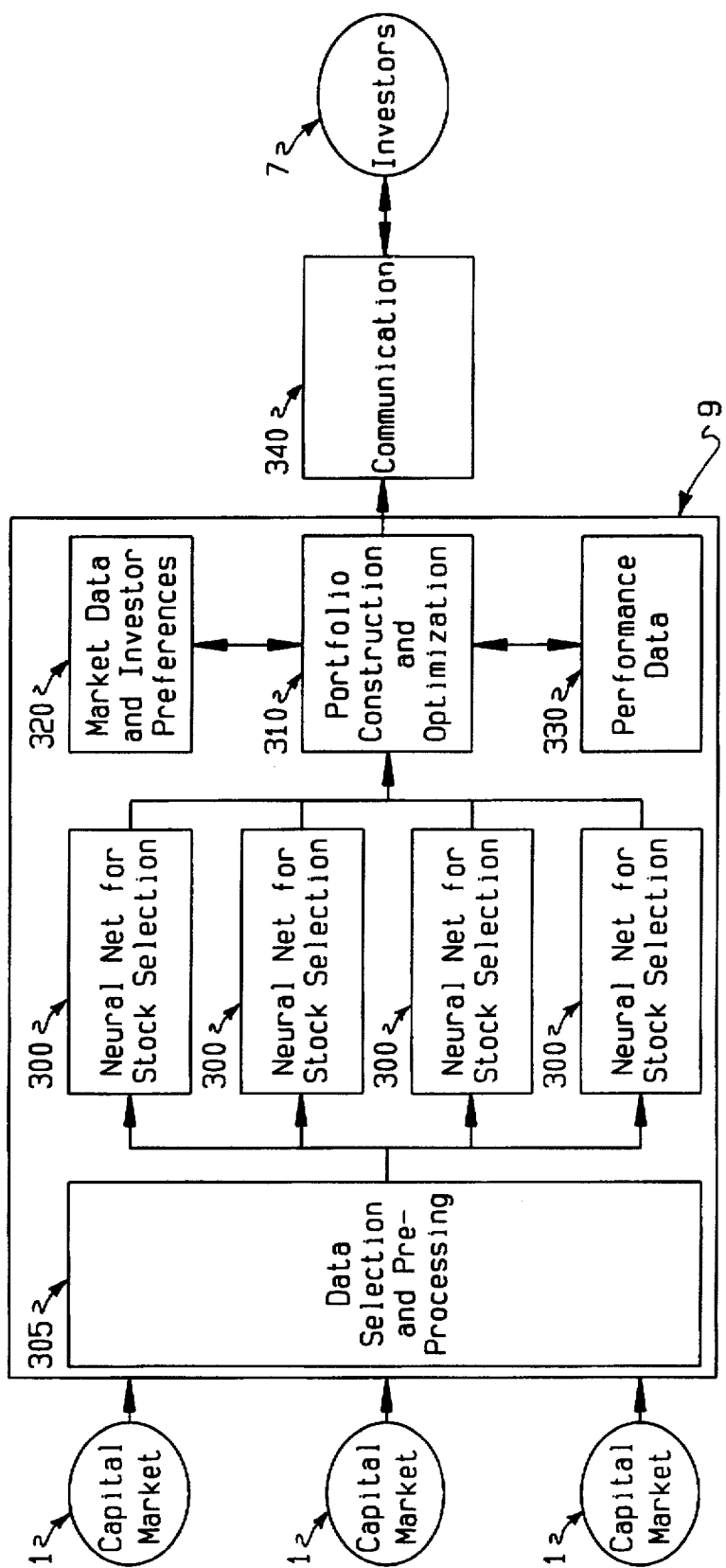
FIG. 1 is a block diagram of the financial management system for creating and administering an investment portfolio in accordance with the preferred embodiment of the present invention.

FIG. 1 illustrates in a block diagram form the financial management system 9 of the present invention which provides investors 7 with a way to invest in capital markets 1. Capital markets 1 may represent one or more domestic and/or foreign stock markets and/or indices associated with the performance of such markets. In a preferred embodiment of the present invention, financial management system 9 comprises: a preprocessing system 305 receiving and selecting input for the stocks in the capital market and general market data; a set of neural networks 300 for estimating the performance potential of the stocks in the market; data processing system 310 designed to create and administer an optimized investment portfolio; storage 320 for storing price and other information about the stocks in the capital market, as well as investor preferences; storage 330 for storing miscellaneous performance characteristics associated with the stocks; and interactive communication means 340 that provides a two-way communication between the investors 7 and the financial management system 9. In one embodiment, financial system 9 is implemented on Pentium PCs, Hewlett-Packard, Sun Microsystems workstations, as known to persons skilled in the art.

Other computer systems known in the art can be employed as a hardware platform for the system of this invention. Such computer systems, as known in the art, comprise a central processing unit (CPU) memory (RAM, ROM, etc.), input and output devices and user interfaces.

Figure 2:
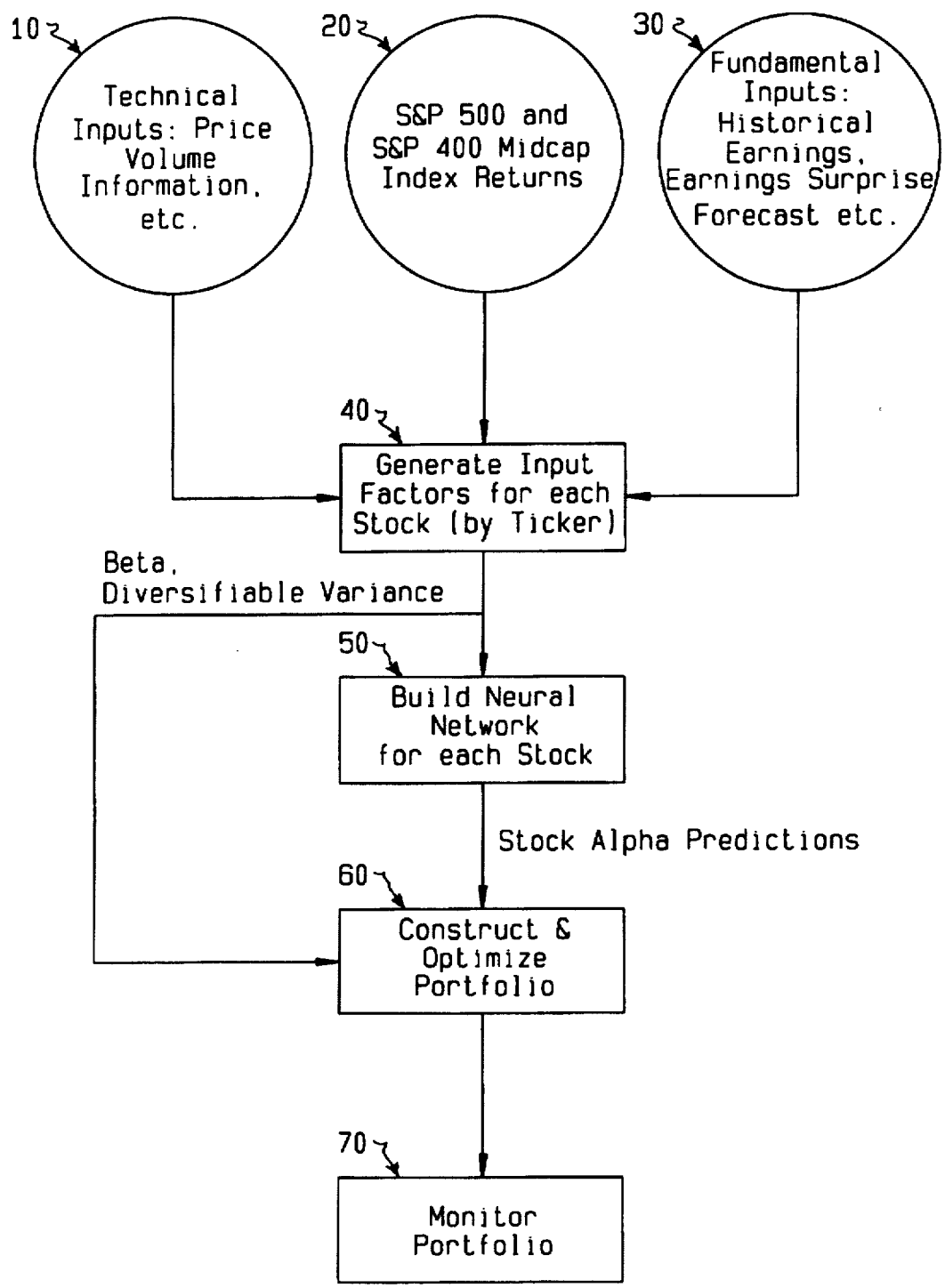
FIG. 2 illustrates, in a block diagram form, the method of the present invention for creating and administering an investment portfolio optimized over a predetermined period of time.

FIG. 2 illustrates, in a block diagram form, the method of the preferred embodiment of the present invention for creating and administering an investment portfolio optimized over a predetermined period of time. Specifically, blocks 10, 20 and 30 illustrate primary sources of information about the stocks in the capital market (for example stocks listed in the S&P 500 (Large Cap) and the S&P 400 (Mid Cap) indices in the U.S.) and about broad market indices associated with the market. Block 10 represents selected technical input information for each stock, such as the price and trading volume of each stock. Block 20 represents returns associated with the indices in the capital market (e.g., the S&P 500 and S&P 400 indices), and block 30 represents fundamental information such as earnings related data. In a preferred embodiment of the present invention, the output of block 30 includes the "Surprise Forecaster Ranking" from Chicago Investment Analytics, Inc., 208 South LaSalle St., Suite 608, Chicago, Ill. 60604. This data indicates the probability of a positive earnings surprise, i.e. the probability that a company will report better earnings than the analysts' estimates. Other data from the same source which may be used in block 30 includes the "Momentum Alert," the "Growth Alert," the "Value Alert", etc. In other embodiments, a person skilled in the art on the basis of this disclosure will be able to use other fundamental data from other sources.

The combined technical and fundamental information from blocks 10, 20 and 30 is then passed to pre-processing block 40, which indicates the functions performed by the system 305 in FIG. 1. Pre-processing block 40 generates a number of data sequences, each sequence representing the values of certain parameters of the stock computed at predetermined time intervals in the past, preferably one week apart. These data sequences are specific for each stock and are subsequently used to train the neural net for each stock. Each data sequence has been historically found to relate to the performance of the stocks and thus may be used as a predictor of their future performance. Appendix A provides a listing of the data sequences of the preferred embodiment of the present invention, along with their definitions, which are preferably generated at block 40. This data includes the parameter BETA ($\beta$) which is a measure of volatility of the stock relative to an underlying benchmark;

ALPHA (α) which is a measure of the excess return of the stock over the beta-adjusted benchmark; the standard deviation of the parameter ALPHA computed over a predetermined period of time; the slope of the earnings surprise rankings and other parameters, as defined in Appendix A and explained in more detail below. On the basis of the present disclosure, a person skilled in the art will be able to use other parameters as well.

Functional block 50 in FIG. 2 denotes the steps required to build and operate a neural network 300 for each stock with the input factors above appropriately scaled. The first step in the process is to select an architecture for the neural network. In accordance with one embodiment of the present invention, the architecture of the neural network is a multilayer feedforward neural net with backpropagation implemented using the generalized delta rule, as described for example in Rumelhart et al., "Parallel Distributed Processing: Explorations in the Microstructure of Cognition," Vol. 1, Ch. 8, MIT Press, Cambridge, Mass., which is incorporated herein by reference. The neural nets defined in this way can be simulated using commercially available software packages such as the BrainMaker Professional marketed by California Scientific Software, NeuralWorks Professional II/Plus from NeuralWare Inc., Neuroshell 2, distributed by the Ward Systems Group, Frederick, Md. 21702, or others. For example, a custom batch version of the Neuroshell 2 program used in a preferred embodiment of the present invention is capable of simulating over 10,000 nets which can be trained in a batch mode repeatedly with the net configuration for each stock (architecture, stopping criteria, etc.) specified in a system file. NeuroShell 2 User's Manual available from Ward Systems Group (and particularly its chapter 5) is hereby incorporated by reference. Appendix B is a listing of the batch configuration file used in the system of the present invention for the purpose of training and testing the neural nets. A person skilled in the art, on the basis of the present disclosure, will also be able to use other neural net software including developing such software. Neural nets 300 in FIG. 1 which correspond to the stocks in the capital market may also be implemented in hardware.

The architecture of the neural net may also be varied (by means of changing the input parameters, the number of hidden layers, by modifying the activation functions, or by other means) if in the course of operation it becomes necessary to more accurately predict the performance potential of the underlying stocks. Thus, different architectures of the nets can be selected for different securities so as to improve performance.

The neural nets for all individual stocks are then trained using the data sequence generated in block 40. The training process continues until the connections between the nodes of the nets reach a desired state, as determined by an appropriate stopping criterion, as well known in the art and discussed in more detail below. Once the neural nets for the stocks of a capital market have been trained in accordance with the present invention, in block 60 the neural nets are used to make a prediction of the appreciation potential of each stock within a predetermined period of time. These predictions are made by running new data through the trained neural nets. The output of each neural net 300 is the parameter ALPHA which is an estimate of the appreciation potential of the corresponding stock over the predetermined period of time. As described below, some factors generated in block 40 are also used in the portfolio construction process to ensure that the portfolio satisfies investor preferences and certain aggregate risk characteristics.

Block 60 in FIG. 2 indicates the operation of the system 310 in FIG. 1, which is used to create an optimized stock portfolio on the basis of the appreciation potential estimates. In this block each stock is allocated a weight proportional to its estimated appreciation potential within the predetermined future time period, such that the risk constraints and investor preferences are satisfied. Such weighing generates model long and short portfolios. These portfolios comprise a selected number of stocks which are estimated to have respectively the best and the worst appreciation potential over the predetermined period of time. An investor utilizing the system of the present invention may then make investment decisions on the basis of the suggested model portfolios. In the following description only the "long" portfolio, comprising stocks estimated to have the best performance over the prespecified period of time, will be considered because the selection process for the "short" portfolio, comprising stocks expected to have the worst performance, is essentially identical (especially if modeled using negative weights during the portfolio construction process).

Finally, in block 70 the system of the present invention continuously monitors the performance of the selected stocks and compares the return of the model portfolio to the overall investment return in the capital market. Should the output of the neural nets for the specific time period indicate that the appreciation potential of certain stocks has changed significantly, data processing system 310 in FIG. 1 may rebalance the composition of the suggested optimized model portfolio, so that the investors using the system may adjust their positions in the capital market accordingly.

Figure 3:
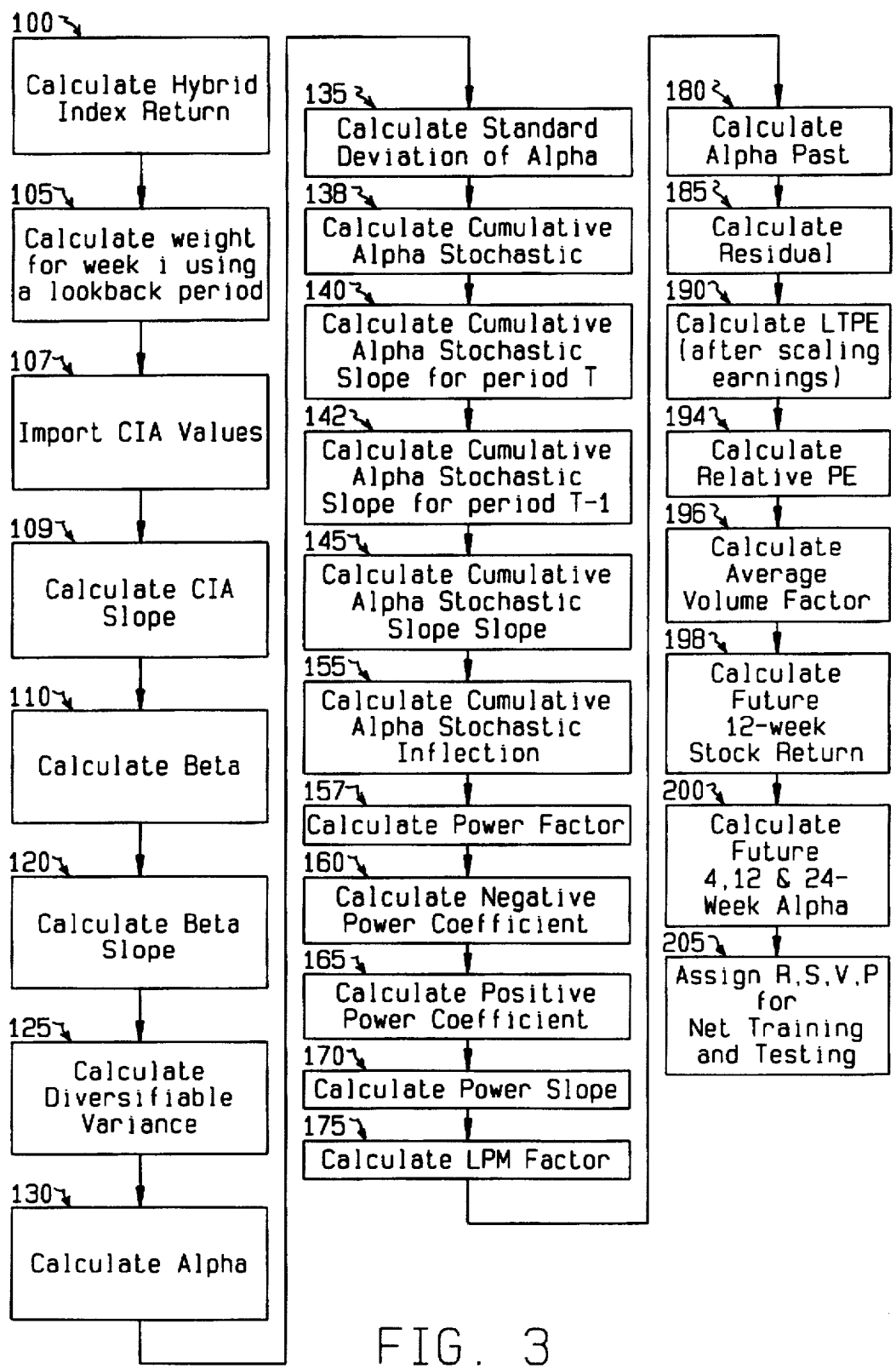
FIG. 3 illustrates, in a block diagram form, the steps required to provide the inputs used for training and operating the neural net for a selected stock.

FIG. 3 illustrates, in a block diagram form, the steps required to generate the data for use as input to the neural net for a given stock. Assuming that the system is designed to track the performance of the U.S. S&P 500 and S&P 400 indices, in step 100 preprocessing system 305 first calculates a hybrid index return which is equal to the average of both index returns.

A sequence of historical stock data is used to generate the inputs used to train the network for a given stock. The importance of newly available data in relation to the less recent data is reflected by the use of the weight factors. Thus, a weight factor $w_i$ associated with the inputs during the i-th time period is calculated in step 105. The value of the weight factor w for the i-th time period is given by the formula:

$$w_i = i/\Sigma,$$

where $\Sigma$ is the sum of all time periods from 1 to N, N being the number of time periods used in the "lookback" process. In a preferred embodiment of the present invention the unit time period is one week, and the number of weeks N is set between 40–120, preferably 84 weeks. As indicated, the application to the input data of a "forgetting factor" $w_i$ is based on the observation that more recent information about a stock is usually more relevant to the prediction of the future performance of the stock.

In the following steps 107 and 109, preprocessing system 305 imports values of the earnings surprise rankings and computes its slope. Preferably, the slope computation is done over a 6-week period. As indicated above, such data is available from Chicago Investment Analytics, Inc., or another appropriate source. In steps 110 and 120, preprocessing system 305 computes the BETA parameter and its slope, respectively, while in step 125 the diversifiable variance is computed. The ALPHA parameter, its standard deviation, and calculations based on the cumulative ALPHA stochastic parameter (such as its slope and inflection) for the stocks are computed in steps 130, 135, 138, 140, 142, 145 and 155 as defined in Appendix A. The sequence of steps for the computation of the hybrid index return, the earnings surprise data, the BETA and ALPHA parameters and other factors derived from such information is shown in FIG. 3 for illustrative purposes only and may also be computed in a different order.

The following steps 157–205 illustrate the sequence used in one embodiment of the present invention to compute values for all remaining input parameters, as defined in Appendix A. Thus, in steps 157 the power factor is computed, in steps 160 and 165 the negative and the positive power coefficients are computed, respectively; in step 170 the power slope is computed; in step 175, the LPM factor is computed; in step 180 the historical ALPHA parameter for the stock is computed; in step 185 the system computes the residual, in step 190 the long-term Price/Earnings (P/E) ratio based on scaled earnings is computed. In steps 194 the relative P/E parameter is computed, in step 196 the Average Volume factor for the stock is obtained. In step 198, preprocessing system 305 computes an estimate for the future stock return and on the basis of this estimate computes in step 200 values for the ALPHA parameter of the stock for a period M weeks into the future (preferably, the computation is done for 4, 12 and 24 weeks). The last step 205 in FIG. 3 illustrates the separation of the available input data into a training, testing, validation and production (referred to as: R, S, V, P, respectively) sets as explained in more detail below and illustrated in FIG. 6.

In accordance with a preferred embodiment of the present invention, the ALPHA parameter estimate is a measure of the appreciation potential, and thus the attractiveness of the stock, and is used by the system to determine which stocks to be included in the model stock portfolio. The number M of weeks which the system looks ahead (the time horizon of the system) is in the range of about 4–30 weeks and is preferably set equal to 12 weeks. The computation of input quantities which are related to the change in the value of a given parameter, such as its slope or inflection, is typically done using the differences between the values of the parameter over a unit period of time.

The method in FIG. 3 is merely illustrative of the method of the present invention, as applied to the problem of predicting the appreciation potential of the stocks. As indicated above, other indicators may be used dependent on the time horizon of the system, the required degree of accuracy and other factors. Input parameters are chosen from a broad set of inputs which are derived from fundamental data about the stock, its price, volume, and index price data. Whether or not a given input should be included as a predictor of the ALPHA parameter is determined using sensitivity analysis, as known in the art. Thus, if a particular input improves the prediction accuracy of the net over a period of time, it is included in the set of inputs. If, on the other hand, a specific input does not measurably correlate with the output ALPHA parameter, as indicated by sensitivity analysis of the prediction results over a period of time, this input may be dropped. Thus, the inputs presented in Appendix A, while illustrative of the general operation of the system of the preferred embodiment, may from time to time be supplemented by other inputs which show a better prediction accuracy for the particular stock. The process of selecting the inputs for the prediction of the appreciation potential of each stock in the market is an ongoing process which aims at finding a set of inputs which can provide good prediction accuracy. On the basis of the present disclosure, a person skilled in the art will be able to select such inputs.

Figure 4:
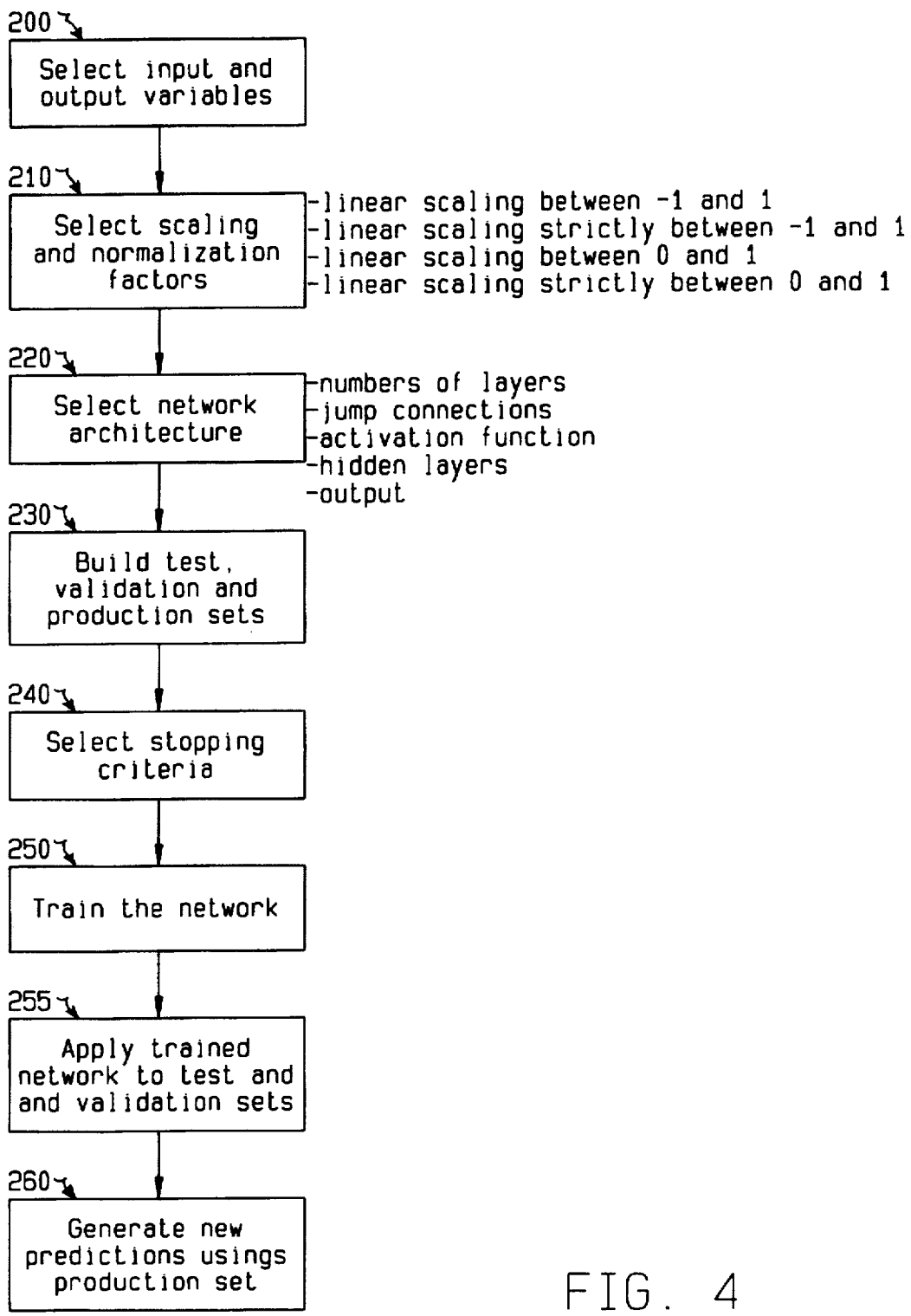
FIG. 4 shows, in a block diagram form, the steps for creating and using a neural net for estimating the performance potential of an individual stock.

FIG. 4 shows the steps for creating and using neural nets to provide an estimate of the appreciation potential of individual stocks on the basis of data generated in the preprocessing system 305. In step 200, the system operator selects the input and output parameters of the neural net training process. The selection of input parameters is described above and illustrated in FIG. 3. In a preferred embodiment of the present invention the output of each neural net is an estimate for the value of the ALPHA parameter of a given stock M weeks ahead.

The following step 210 of the method involves normalization and scaling of the values provided to the system within pre-specified boundaries. Several scaling options are available. In a preferred embodiment of the present invention, the option is to use linear scaling of the input parameters between −1 and +1 with allowance for overshoots in the new data. Other available scaling options include:

a) linear scaling between −1 and +1, no overshoots allowed;

b) linear scaling between 0 and 1, no overshoots allowed; and c) linear scaling between 0 and 1 with allowance for overshoots.

Scaling of the input parameters of a neural net is well known in the art.

Figure 5:
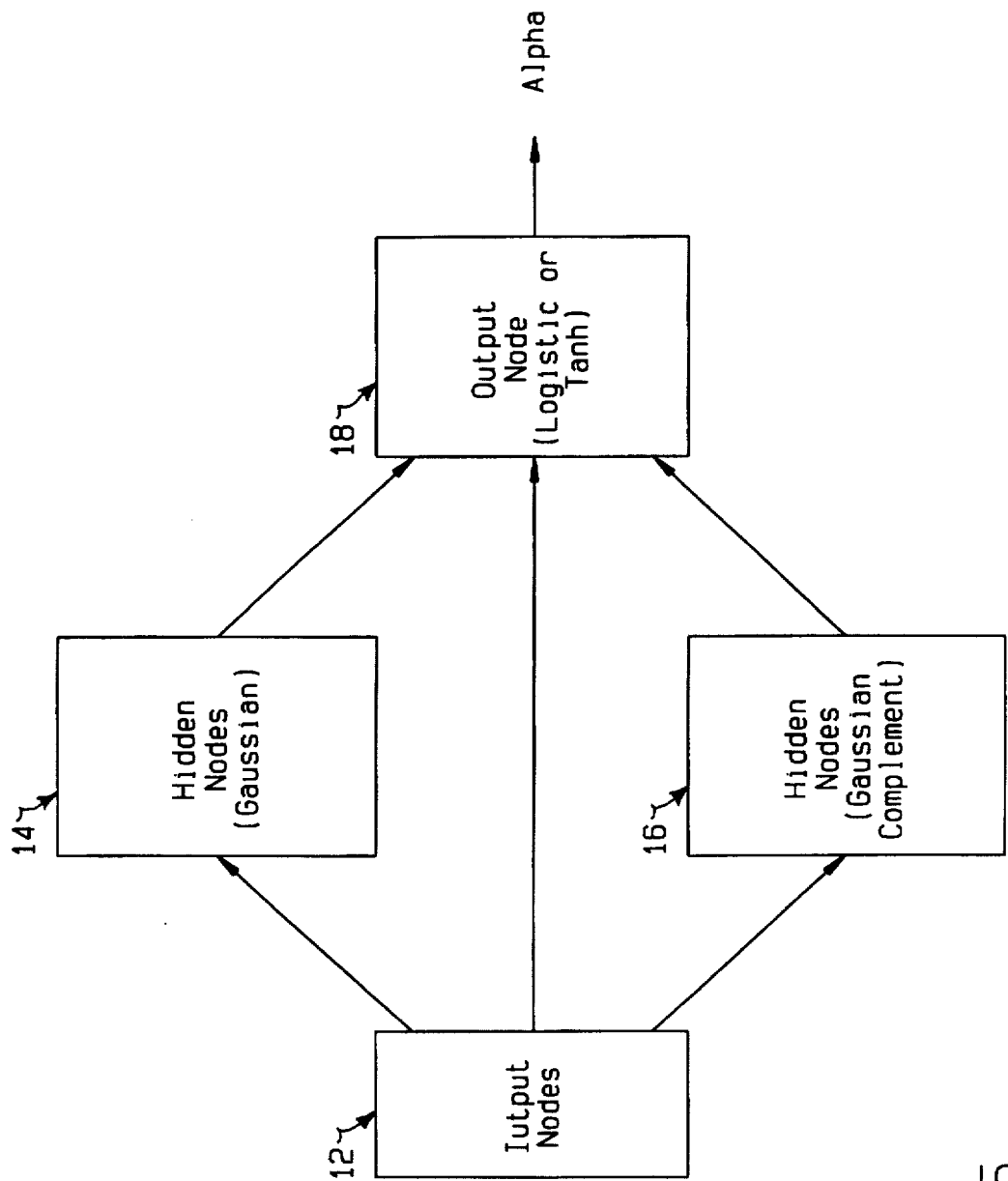
FIG. 5 is a schematic diagram of a neural net configuration employed in the preferred embodiment of the present invention.

In step 220 the architecture of the network is selected. As illustrated in FIG. 5, in accordance with a preferred embodiment of the present invention, each neural network consists of three layers of nodes with links between the nodes in each layer and jump connections between the input and output layers. Input layer 12 has preferably 15–20 input nodes, receiving inputs from preprocessing system 305. Input layer 12 is connected directly to the output layer 18 which only has one node. The hidden layer of nodes is split into two groups: a) a group of nodes 14 preferably using a Gaussian activation function ($\exp(-x^2)$); and b) a second group of nodes 16 preferably using a Gaussian complement activation function ($1-\exp(-x^2)$). Other activation functions, such as the logistic ($1/(1+\exp(-x))$, the symmetric logistic ($2/(1+\exp(-x))-1$), the sine ($\sin(x)$), or the tanh ($\tanh(x)$), where tanh is the hyperbolic tangent, may also be used in other embodiments for the nodes of the neural net. The hidden layer groups 14 and 16 have preferably 5–13 nodes each and receive input from the input layer 12. The output node layer 18 of the system preferably uses a logistic activation function. As indicated above, the network itself is implemented using a standard software package, running on a computer, or in other embodiments using customized software and/or hardware.

Following the selection of the network architecture, in accordance with the method of the present invention steps 230, 240 and 250 in FIG. 4 implement a neural net training process. In a specific embodiment, a total of 3,000 neural nets are trained, one for each stock in the S&P 500 and S&P 400 indices and 2,100 other stocks which are selected using capitalization and liquidity screening as known in the art. More specifically, in step 230 of the preferred embodiment the data set is partitioned according to the illustration in FIG. 6. In step 240 stopping criteria for the training process are selected, which may be one or more of the following: a) the average error is below a certain threshold; b) the number of passes through the training set since reaching a minimum average error exceeds a pre-specified number; c) the largest prediction error is below a certain level; or d) the number of passes through the training set has reached a preset limit.

Figure 6:
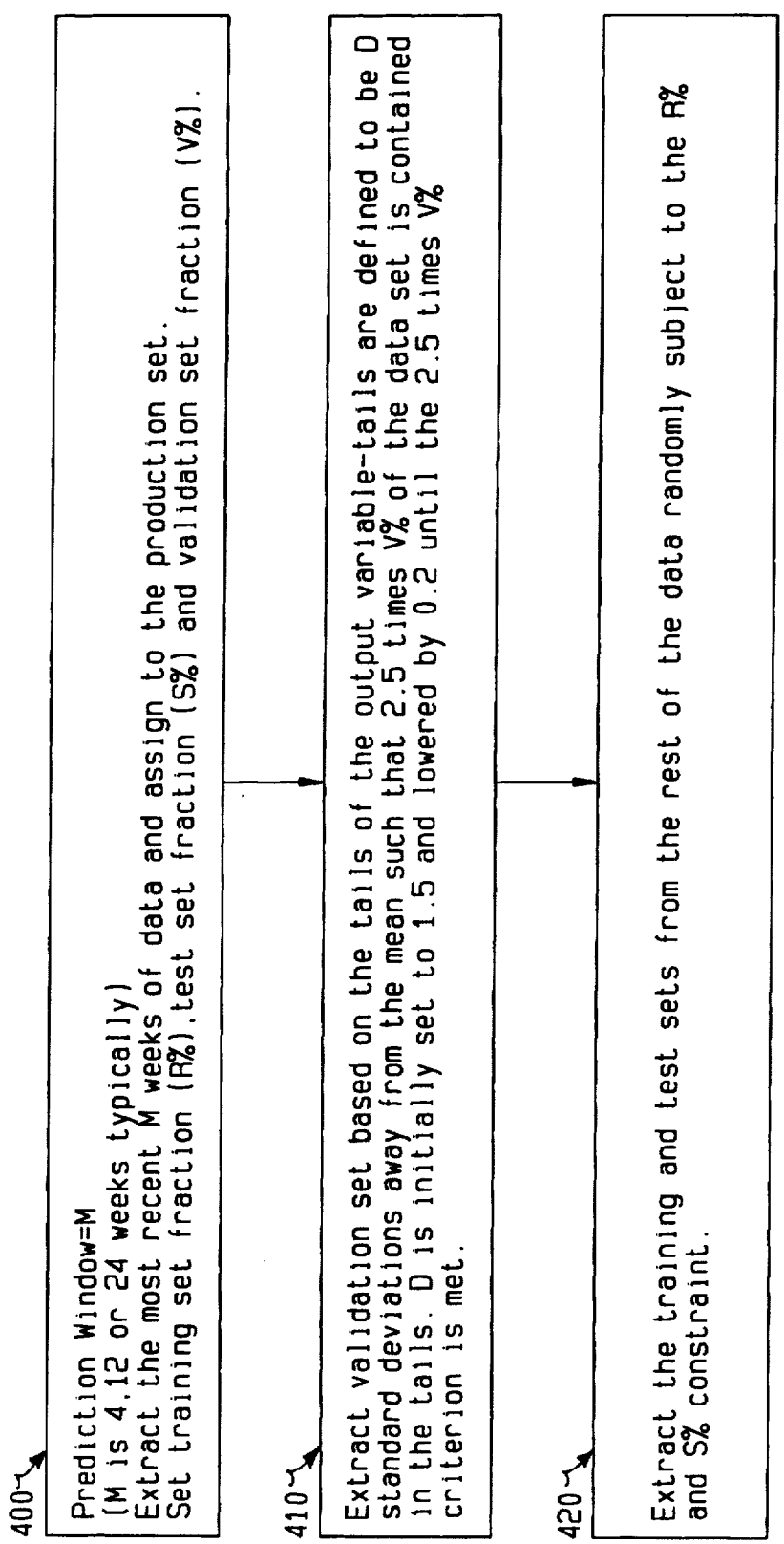
FIG. 6 illustrates, in a block diagram form, the method of extracting the training, test and validation sets from the entire data set in a preferred embodiment of the present invention.

In step 250 each network is trained using data from the inputs provided by the preprocessing system 305 and as extracted by block 420 in FIG. 6. During training, the network is tested every P events (an event involves data pertaining to one time period), where preferably P=20, to see whether a better net has been found, in which case the parameters of the new net are saved. For each stock, and correspondingly for each training process, a stopping criterion is defined such that after the system reaches a certain degree of confidence, or a certain error rate in the recognition of input patterns, the training process is terminated. The training process can be stopped when any of the above stopping criteria is met.

Considering step 250 in further detail, in the preferred embodiment of the system of the present invention the training process uses all available data about a particular stock. Thus, each week a set of new values for each input to the neural nets is stored and used in the training process. As illustrated in FIG. 6, the entire data sequence is divided into a training set, a test set and a validation set. Specifically, in step 400, the data for the M most recent weeks, where M is the time horizon of the system, is extracted to form a separate "production set." The training, test and validation sets of data are chosen randomly, subject to the constraint that the extreme values of the ALPHA parameter are represented in all sets. Excluding the production set, preferably about 65% of the data is used for training (R %), about 15% is used for the test set (S %) and about 20% is used for the validation set (V %). Thus, in a case of about 400 weeks of available data, where the prediction is made 12 weeks ahead, about 252 weeks are used for training, 58 weeks are used for testing and 78 weeks are used for validation. A person skilled in the art, on the basis of this disclosure, can select different values where appropriate.

The validation set is first extracted in step 410, based on the tails of the output parameter distribution. Tails are defined to be more than about D (initially D=1.5) standard deviations away from the mean, as long as at least 60% of the tails remain for inclusion in the training and test sets. If such condition is not satisfied by the available data sequence, the value for D is lowered in steps of 0.2, until the condition is met. Following that selection, the training and test sets are extracted in step 420 in a random fashion from the remaining data, subject to their relative percentages constraint.

In accordance with the preferred embodiment of the present invention the net is trained using the training set. The test set is used to decide when to stop the training process, and the validation set is used to decide how good the net's predictions are. Specifically, the network is tested several times during a complete pass through the training set (one complete pass through the training set is defined as an epoch). For example, the network can be tested every 20 weeks of data and the network weights are saved if the performance of the current neural net on the test set is better than the performance of the previously saved neural net. The training process stops after about 250 epochs, or if the network goes through 20,000 events of weekly data (which includes several passes through the same data) without improvement, or if the average root-mean squared (RMS) error is less than a given threshold (0.001 is a typical value which can be used for the logistic activation function at the output node).

Finally, the validation set is used to determine how good the ALPHA parameter estimates are for the particular stock. Dependent on the recorded errors in the validation process, the system assigns a measure of goodness (or reliability) for the parameter ALPHA estimate of a particular stock, and uses this measure later in the process of optimized portfolio generation.

During the training process the weights of the network are adjusted in increments or decrements which correspond to the prespecified learning rate of the net (higher learning rates may result in faster "convergence," but also often produce larger prediction errors). The system of the preferred embodiment of the present invention additionally uses a momentum factor, which takes into account the previous weight change in determining the step size of the present weight change. Such a momentum factor is useful in reducing the effects of noisy data and makes the training process dependent on how close the net is to its final state. In the system of the present invention, typical values for the learning rate and the momentum are 0.1 and 0.1, respectively.

One of the problems in stock or market return modeling is the propensity to "overfit" the model to the training data, which usually results in poor performance on the test set and production set. In the present invention, the use of both test and validation sets alleviates this problem because the performance of the net can be monitored periodically. More specifically, if the net is overtrained with data from the training set, the prediction accuracy of the net when applied to the test set data is likely to drop. In this case the system may discard the overtrained net and use a previously saved net configuration. In any case, the validation set is used to insure that the performance of the net on data, which is not used in the training process or in determining when to stop the training, does not deteriorate.

Turning back to FIG. 4, in step 260 the trained network is finally used to predict the appreciation potential of the particular stock M weeks ahead by running the current input factors derived from new market data (the production set) through the neural net. As discussed above, in a preferred embodiment of the present invention, the appreciation potential of the stock is estimated 12 weeks ahead and is expressed in terms of predictions of its ALPHA parameter.

In a specific example, assuming the ALPHA parameter predictions are being made 12 weeks forward, the production set which is not employed in the training process consists of the latest 12 weeks of data. Using the trained net, the system first generates an ALPHA parameter prediction $P_1$ for the following week (time T+1) using data from 11 weeks ago (T−11). Next, an ALPHA parameter prediction $P_2$ is generated for two weeks into the future (T+2), using data from ten weeks ago (T−10); and so on until a total of 12 predictions $P_i$ (T+12 being the last time horizon) for the ALPHA parameter are generated. Each of the predictions $P_i$ is associated with a partial actual ALPHA value $A_i$, which corresponds to the actual ALPHA parameter realized until the current time for the security. Thus, $A_1$ is the partial actual ALPHA parameter from 11 weeks ago through the current week, and $A_{12}$ is equal to zero. On the basis of the predictions $P_i$ and actual partial values $A_i$ an average unrealized ALPHA parameter value for the security is calculated, using the following formula:

$$\text{Aver. unrealized } \alpha = \frac{1}{12} \sum_{i=1}^{12} (P_i - A_i)$$

The average unrealized ALPHA is used as a summary statistic for the appreciation potential of each stock, and is used in the portfolio optimization process.

Figure 7:
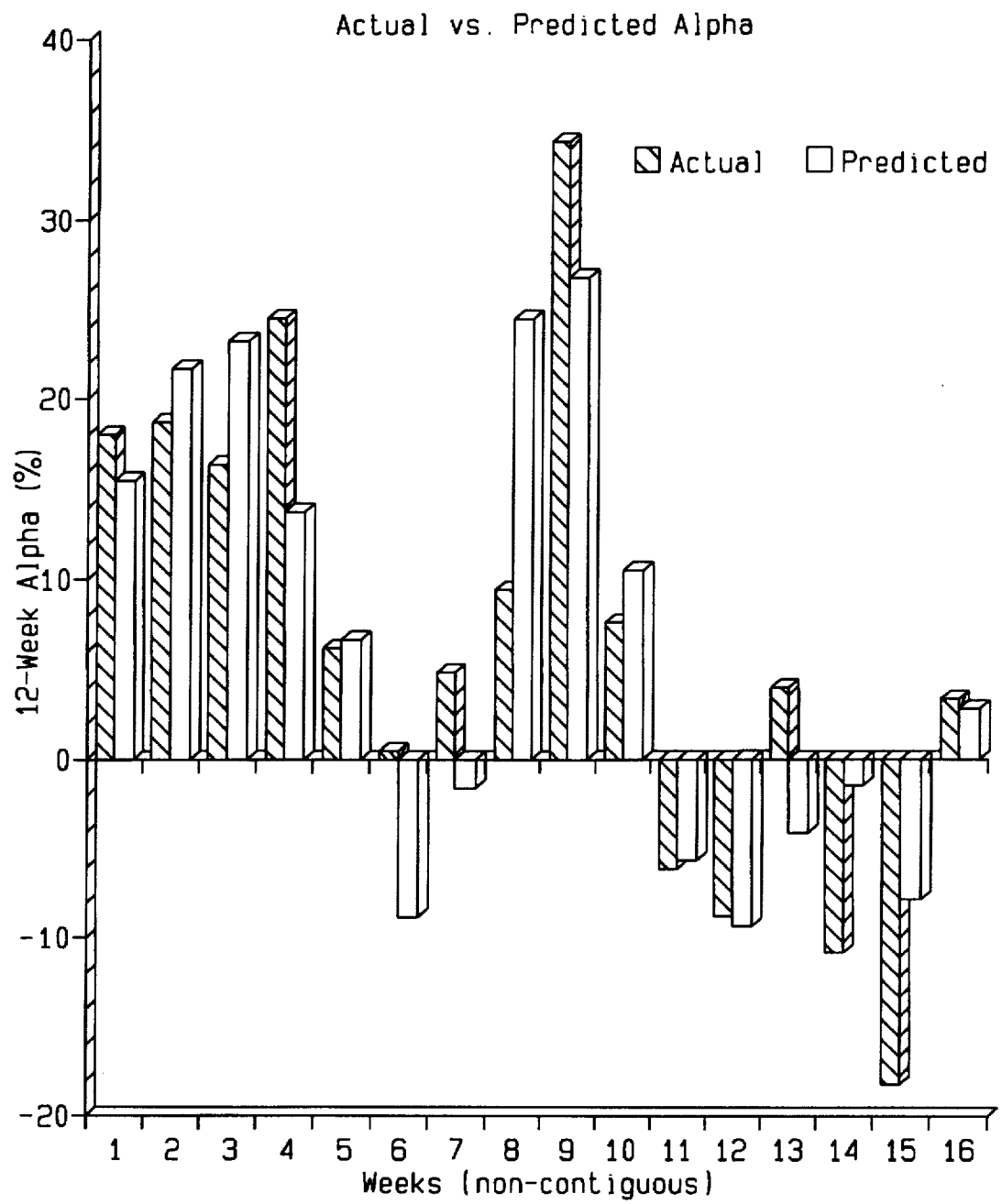
FIG. 7 depicts an example of a display of the actual and predicted 12 week ALPHAs from the validation set for a specific stock using one embodiment of the present invention.

FIG. 7 depicts a display of the actual and predicted 12-week ALPHAs from the validation set for a specific stock using the trained neural net for that stock.

In accordance with another aspect of the present invention, a model portfolio of stocks may be generated on the basis of the stock appreciation potentials estimated by the neural nets 300 and a set of factors that control risk, such as the BETA and the Diversifiable variance, as well as investor preferences.

Referring back to FIG. 1, the selection of an optimized portfolio of stocks is done in accordance with the preferred embodiment of the present invention using a program implemented in the data processing system 310. Data processing system 310 receives and stores in storage 330 data about the appreciation potential of each stock in the capital market and then correlates this input data with risk factors and investor defined constraints stored in storage 320 to generate an optimized portfolio of stocks. Data processing system 310 further models the performance of the overall market, and predicts the future correlation between the return of the selected portfolio and at least one index of the capital market to ensure that the portfolio will provide a desired investment return over the predetermined period of time.

Typically, the selected optimized portfolio contains much fewer stocks than the underlying performance benchmark portfolio (such as the S&P 500 Index or the S&P 400 MidCap Index). This is because the portfolio creation process concentrates on stocks that have a large appreciation potential along with favorable liquidity and risk characteristics.

The portfolio optimization of the preferred embodiment is implemented using commercially available software modules that aid portfolio selection and risk and investment analysis. These include commercial optimizers such as the "Solver" which is part of the Excel spreadsheet program from Microsoft Corporation, the "Evolver", a genetic algorithm based program from Axcelis Inc., 4668 Eastern Avenue North, Seattle, Wash. 98103, or software packages which are available from the Harvard Business School in Cambridge, Mass., or vendors such as Barra International in San Francisco, Real Decisions Corporation in Darien, Connecticut and others. Such commercial portfolio optimizers can be integrated as part of data processing system 310. Other commercial products or custom software can be used and developed by persons skilled in the art on the basis of the disclosure.

In operation, data processing system 330 continuously monitors the performance of the optimized portfolio and compares its overall investment return to the broad market benchmarks of the associated capital market. In addition, neural nets 300 compute the appreciation potential parameter ALPHA for each stock in the market. This information is processed by the portfolio optimizer in system 310 which determines the composition of the optimized portfolio. In the U.S. capital markets this portfolio includes about 50-70 stocks; for example, the MidCap portfolio has about 60 stocks out of a total of 400 stocks. If the system detects a degradation in the cumulative ALPHA parameter of the portfolio, or if the neural nets indicate high appreciation potential in stocks which are not included in the optimized portfolio or low potential in stocks which are part of the optimal portfolio, the composition of the portfolio can be changed.

In accordance with a preferred embodiment of the present invention, rebalancing of the optimized portfolio can be effected at regular time intervals, such as one week, or be triggered by large variations in the output of the neural nets. In particular, data processing system 310 receives input about the predicted ALPHA parameter of each stock in the market from the neural nets. This information is analyzed along with other factors, such as the BETA parameters of the stocks, market sector constraints, transaction costs and other data stored in storage 320 and 330 to check whether the existing stock portfolio's expected return can be improved. As a result of the analysis, the portfolio optimizer may suggest rebalancing the previously optimized portfolio by one or many of the following: 1) changing the existing stock positions in the portfolio, e.g. suggesting a 3% position in a particular stock from an earlier 2.1% position; or 2) adding a new stock to the portfolio with an appropriate weight; or 3) deleting an existing stock from the portfolio. The suggested changes can then be implemented by a human operator.

The above described preferred embodiment of the system of the present invention is merely illustrative of the principles of this invention. Numerous modifications and adaptations thereof will be readily apparent to those skilled in the art without departing from the spirit and scope of the present invention which is defined in the following claims.

APPENDIX A

Inputs and Outputs to the Neural Net

The following are the inputs to the neural net. Those with (**) are not used by the neural net.

** TICKER

This is the ticker of the stock. (e.g. ACN)

** DATE

This is the Date of the data as of Friday. Dates start in January, 1985. (e.g. Apr. 29, 1988)

CIA

This is the surprise ranking factor (measuring the probability of an earnings surprise in the forthcoming quarter) as downloaded from Chicago Investment Analytics. Values range from 1 to 100 (a 1 implies the highest probability of positive earnings surprise in CIA's universe of stocks) and values that were undefined for certain weeks are assigned a 50. (e.g. 13).

CIA_SLOPE

This is the regression slope of the surprise ranking factor values for the last N (currently 6) observations. (e.g. 0.2041).

BETA

Beta (measure of volatility) for the ticker (stock) returns. (e.g. 1.3263)

Beta=CoVar Stk/Var Index

CoVar=(Sum of all (RIndex-AVG*RSTK-AVG)/Number of periods)

Var Index=(Sum of (RIndex-AVG*RIndex-AVG)/ Number of periods)

RIndex-AVG=Current Return on Index−Average Return on Index

RSTK-AVG=Current Return on STK−Average Return on STK

Current Return on Index and STK are front-end loaded with the period weighing factor for calculating Beta and other factors below.

BETA_SLOPE

This is the regression slope of beta for the last N (currently 4) observations (weeks). (e.g. 0.1334)

DIV_VAR

Diversifiable Variance (e.g. 0.2469)

Div Var=Var STK−(Beta*Beta*Var Index)

Var STK=(Sum of Squares of RSTK-AVG)/Number of periods

Var Index=(Sum of Squares of RSP-AVG)/Number of periods

SDEV_ALPHA

Standard Deviation of Alpha value. Alpha is the difference between the stock's actual return and the expected return (based on its Beta). (e.g. 11.9753)

ASTOCH
   Cumulative Alpha Stochastic (e.g. 83.3330)
   Average of latest 6 weeks of K A.
   K A=((Current week cumulative Alpha−Minimum cumulative Alpha over 6 weeks)/(Maximum cumulative Alpha over 6 periods Minimum cumulative Alpha over 6 weeks))*100

A_SLOPE
   Slope of the cumulative Alpha Stochastic for the current period (T) which is the regression slope of the cumulative Alpha Stochastic value for the last N (currently 4) observations starting at the current period (week). (e.g. 3.9160)

A_SLOPE_T1
   Slope of the cumulative Alpha Stochastic for the previous period (T−1) which is the regression slope of the cumulative Alpha Stochastic value for the last N (currently 4) observations starting at the previous period (previous week). (e.g. 0.9560).

A_SL_SL
   Slope of the Slope (second derivative) of the cumulative Alpha Stochastic. (e.g. 2.9600). The formula is simplified to the difference between the slopes of the cumulative Alpha Stochastics at the current and the previous periods.
   Al_SL_SL=A_Slope−A_Slope_T1

INFL
   Inflection indicator based on the value of the cumulative Alpha Stochastic (e.g. 0)
   If Alpha_Slope>=0 and Alpha_Slope_T1<0 then Infl=1 Else
   If Alpha_Slope<=0 and Alpha_Slope_T1>0 then Infl=−1 Else Infl=0

**POWER FACTOR
   Return on Stock=((Curr Stock Close−Stock Close previous week)/Stock Close previous week)*100*Period Weighting
   Return on Index=((Curr Index Close−Index Close previous week)/Index Close previous week)*100*Period Weighting
   Power Factor=(Return on Stock−Return on Index)*Period Weighting POS_PWR_FC
   Positive Power Factor. (e.g. 0.2313)
   Positive Power Factor=Cumulative Power Factor/Value A/Value B
   Value A=Number of positive values in return on Index
   Value B Standard Deviation of Power considering only those time periods with positive return on the Index NEG_PWR_FC
   Negative Power Factor. (e.g. 0.7823)
   Negative Power Factor=Cumulative Power Factor/Value C/Value D
   Value C=Number of negative values in return on Index
   Value D=Standard Deviation of Power considering only those time periods with negative return on the Index PWR_SLOPE
   8-week regression slope of the Negative Power Factor values. (e.g. 0.0422).

LPM_FC_MN
   Lower Partial Moment. (e.g. 13.4200)
   LPM_FC_MN=Average of LPM Factor over each week in the lookback period.
   LPM Factor=(Maximum of 0 or (Beta Adjusted Return on Index−Return on STK)) to the power of LPM Degree.
   LPM Degree is a parameter typically in the range of 1.5 to 2.5 (currently 2).

ALPHA_PAST
   Alpha Past=Average of Alpha over the lookback period. (e.g. 1.9509)

RESIDUAL
   Residual=1−r squared value of linear regression of STK Return and Index Return. (e.g. 0.5340)

LTPE
   Long Term P/E Ratio=Current Closing Price/Scaled Earnings. (e.g. 0.5747)
   Scaled Earnings is the 12-month trailing earnings transformed to a value from 1 to 100.

RELPE
   Relative Price Earnings is the P/E relative to the index. (e.g. 2.2010)

AVGVOL
   Average Volume Factor (in percent). (e.g. 101.8800)
   AVGVOL=100*(Current week's volume/Average weekly volume over the last 10 weeks)

Note: Only one of the following outputs is considered at a time by the neural net.

STK_RET12
   Stock Return 12 weeks into the future. (e.g. 0.01)
   STK_RET12=(Stk Close 12 weeks ahead−Curr Stk Close)/Curr Stk Close.

ALPHA_4_FUTURE
   Alpha 4 weeks into the future. e.g. 0.09
   Alpha_4_Future=STK_RET4−((Index_RET4−Cash_RET4)*Beta+Cash_RET4)
   STK_RET4=(Stk Close 4 weeks into the future−Curr Stk Close)/Curr Stk Close.
   Index_RET4=(Index Close 4 weeks into the future−Curr Index Close)/Curr Index Close.
   Cash_RET4=(Cash Close 4 weeks into the future−Curr Cash Close)/Curr Cash Close.

ALPHA_12_FUTURE
   Alpha 12 weeks into the future. (e.g. −0.15)
   Alpha_12_Future=STK_RET12−((Index_RET12−Cash_RET12)*Beta+Cash_RET12).
   STK_RET12=(Stk Close 12 weeks into the future−Curr Stk Close)/Curr Stk Close.
   Index_RET12=(Index Close 12 weeks into the future−Curr Index Close)/Curr Index Close.
   Cash_RET12=(Cash Close 12 weeks into the future−Curr Cash Close)/Curr Cash Close.

ALPHA_24_FUTURE
   Alpha 24 weeks into the future. (e.g. 0.21)
   Alpha_24_Future=STK_RET24−((Index_RET24−Cash_RET24)*Beta+Cash_RET24).
   STK_RET24=(Stk Close 24 weeks into the future−Curr Stk Close)/Curr Stk Close.
   Index_RET24=(Index Close 24 weeks into the future−Curr Index Close)/Curr Index Close.
   Cash_RET24=(Cash Close 24 weeks into the future−Curr Cash Close)/Curr Cash Close.

Note: This variable is used to designate which "rows" go into the training set (R), the test set (S) and the validation set (V).

TT
   Code for the Neural net which can have the values R, S, V. (e.g. R)
   The values are distributed based on a percentage (of the entire dataset) to each of the 3 values. e.g. 65%, −15%, 20%.

Note: Factors (such as Beta) that require a lookback period for the calculation typically use a value in the range of 50 to 120 weeks (currently 84).

APPENDIX B
Configuration file for Batch Stock Neural Net Training/Testing

"Input file type:", 0 /* Comma separated ascii file */
"Output file type:", 0
"Header row: ",1 /* Number of header rows */
"Input dir:", "<input directory name>"
"Output dir:", "<output directory name>"
"Maximal number of columns:",26
"Maximal number of rows", 500
"Number of columns:",26 /* Actual total number of columns in file */
"Number of rows", 397 /* Actual number of rows in first file */
"Pattern extraction method:",0,2,2,1 /* Pattern extraction using TT column */
"Number of all parameters",26 /* Number of parameters (listed below) */
"Parameter # 1:","TICKER"
"Parameter # 2:", "DATE"
"Parameter # 3:", "CIA"
"Parameter # 4:","CIA_SLOPE"
"Parameter # 5:","BETA"
"Parameter # 6:","BETA_SLOPE"
"Parameter # 7:","DIV_VAR"
"Parameter # 8:","SDEV_ALPHA"
"Parameter # 9:","A_SLOPE"
"Parameter # 10:","A_SLOPE_T"
"Parameter # 11:","A_SL_SL"
"Parameter # 12:","INFL"
"Parameter # 13:","ASTOCH"
"Parameter # 14:","POS_PWR_FC"
"Parameter # 15:","NEG_PWR_FC"
"Parameter # 16:","PWR_SLOPE"
"Parameter # 17:","LPM_FC_MN"
"Parameter # 18:","ALPHA_PAST"
"Parameter # 19:","RESIDUAL"
"Parameter # 20:","LTPE"
"Parameter # 21:","RELPE"
"Parameter # 22:","AVGVOL"
"Parameter # 23:","STK_RET12"
"Parameter # 24:","ALPHA_4_FUTURE"
"Parameter # 25:","ALPHA_12_FUTURE"
"Parameter # 26:","ALPHA_24_FUTURE"
"Number of input parameters:",16 /* Actual number of inputs (listed below) */
"Input parameter:","CIA",1
"Input parameter:","CIA_SLOPE",1
"Input parameter:","BETA",1
"Input parameter:","BETA_SLOPE:,1
"Input parameter:","SDEV_ALPHA",1
"Input parameter:","A_SLOPE_T1",1
"Input parameter:","INFL",1
"Input parameter:","ASTOCH",1
"Input parameter:","NEG_PWR_FC",1
"Input parameter:","PWR_SLOPE",1
"Input parameter:","LPM_FC_MN",1
"Input parameter:","ALPHA_PAST",1
"Input parameter:","RESIDUAL",1
"Input parameter:","LTPE",1
"Input parameter:","RELPE",1
"Input parameter:","AVGVOL",1
"Number of output parameters:",1 /* Number of outputs */
"Output parameter:","ALPHA_12_FUTURE",2 /* Output and scaling type */
/* ALPHA_4_FUTURE is the other commonly used output */
"Net type:",5 /* Net architecture type */
/* 2 hidden slabs with direct input-output links */
"Slab 0:",16,0 /* Input slab: 16 nodes */
"Slab 1:",11,3 /* Hidden slab 1: 11 nodes with Gaussian Activation */
"Slab 2:",11,7 /* Hidden slab 2: 11 nodes with Gaussian Compl. Activation */
"Slab 3:",1,2 /* Output node: 1 node with Logistic Activation */
"Slab 4:",1,0 /* Unused */
"Random seed:",1,1 /* For initializing link weights */
"Initial weights range:",0,3
"Learn rate:",0.1 /* Parameter in backprop algorithm */
"Momentum:",0.1 /* Parameter in backprop algorithm */
"Pattern selection:",0 /* Random pattern selection each epoch */
"Missing values:",4 /* Report error on missing values */
"Weight update:",1 /* Use momentum-based weight update */
"Net perfect interval:",20 /* testing interval */
"Stop when learn epochs>:",1,250 /* criterion for stopping training */
"Stop when average error<:",1,0.001 /* criterion for stopping training */
"Stop when events since . . . >:",1,20000 /* criterion for stopping training */
"Stop when largest error<:",0,0.1 /* not used */
"Apply to train:",1 /* after training, apply net to training set */
"Apply to test:",1 /* after training, apply net to test set */
"Apply to production1:",1 /* after training, apply net to validation set */
"Apply to production2:",1 /* after training, apply net to production set */
"Automatic setting of hidden neurons: ", 0 /* Set no. of hidden nodes manually */
"Min/max calculation method:",0 /* use only training data for min/max calc */
"Rem ------------ Control block to work in unix -----"
"Rem Operation: -1=no operation, 0=start over, 1=continue existing, 2=apply net
"Operation:",0 /* re-start training from scratch every week */

What is claimed is:

1. A system comprising one or more computers for selecting a portfolio of securities expected to provide, within a predetermined period of time, a return superior to a risk-adjusted performance of a selected market index, the system comprising:

a plurality of predictive neural network means for estimating an appreciation potential of participating securities of a capital market over the period of time, each of the neural network means estimating the appreciation potential of a separate individual security of the participating securities, wherein each of the neural network means has been trained using data relating to a corresponding security so as to adjust weights of each of the neural network means;

portfolio construction means for selecting an investment portfolio on the basis of the estimated appreciation potential of the participating securities, determined by the plurality of the predictive neural networks, such that the expected return on the selected investment portfolio over the predetermined period of time is superior to the performance of the selected index; and means for receiving information about the participating securities.

2. The system of claim 1 wherein the appreciation potential of each security is a parameter which is related to the expected excess return of the security over the risk-adjusted index return of the capital market.

3. The system of claim 2 further comprising:
   means for computing a tracking error indicative of the deviation of the determined performance of the investment portfolio from the risk-adjusted index value of the capital market; and
   means for rebalancing the investment portfolio on the basis of the input from the means for computing.

4. The system of claim 2 wherein the portfolio optimization means comprises:
   storage means for storing data for each security in the capital market; and
   optimization means for selecting an optimal portfolio on the basis of the input from the storage means; wherein the optimization means operate in accordance with an optimization function using a set of constraints on the estimated appreciation potential of each security, risk factors and investor preferences.

5. The system of claim 2 further comprising means for expressing the appreciation potential for each security in both U.S. currency and the local currency of the capital market.

6. The system of claim 3 wherein the means for rebalancing of the investment portfolio comprises means for generating a list of the security holdings of the portfolio arranged in a descending order of the estimated appreciation potential.

7. The system of claim 2 wherein the neural network means operates on the basis of input data associated with each security of the portfolio relates, which input data comprises: a set of fundamental financial characteristics for the security, a sequence of price returns and trade volume statistics for the security, and a sequence of price returns of the index associated with the capital market.

8. The system of claim 7 wherein the neural network means comprises: an output node for outputting a signal related to the estimated appreciation potential of a security, a plurality of input nodes for receiving input data, and a plurality of intermediate nodes connected between the input nodes and the output node and having links with weight values being changed by using a repetitive weight adjustment based on the evaluation of the output from the output node.

9. The system of claim 8 further comprising correction means for evaluating the signal received from the output node, the correction means outputting a signal for changing the weight values of the links when it is determined that a correction is required.

10. The system of claim 7 wherein the neural network means comprises a neural network for each security of the capital market and the input to each neural network further comprises:
   a parameter $\beta$ related to the systemic risk of the security with respect to the underlying index associated with the capital market;
   a parameter $\beta_{SL}$ associated with the change of the $\beta$ parameter over the second limited period of time.

11. A method for administering an investment portfolio of securities expected to provide, within a predetermined limited period of time, a return superior to performance of a selected market index, the method comprising the steps of:
   estimating an appreciation potential of participating securities of a capital market over the limited period of time using a plurality of predictive neural network means, wherein each of the predictive neural network means estimating appreciation potential of a separate individual security of the participating securities, wherein each of the neural network means has been trained using data relating to a corresponding security so as to adjust weights of each of the neural network means;
   selecting an optimized investment portfolio on the basis of the estimated appreciation potential of the participating securities, determined by the plurality of the neural network means, such that the expected return on the selected investment portfolio over the predetermined period of time is superior to the performance of the selected index; and
   receiving information on each security of the selected investment portfolio.

12. The method of claim 11 wherein the appreciation potential of each security is a parameter related to the expected excess return of the security, over the index return of the capital market.

13. The method of claim 12 further comprising the steps of:
   computing a tracking error indicative of the deviation of the determined performance of the investment portfolio from the index value of the capital market; and
   rebalancing the investment portfolio on the basis of the computed tracking error.

14. The method of claim 12 wherein the step of selecting further comprises the steps of:
   storing data related to each security in the capital market; and
   optimizing the investment portfolio on the basis of an optimization function which uses a set of constraints on the estimated appreciation potential of each security, risk factors and investor preferences.

15. The method of claim 12 further comprising the step of expressing the appreciation potential for each security in both U.S. currency and the local currency of the capital market.

16. The method of claim 13 wherein the step of rebalancing the investment portfolio comprises the step of generating a list of the security holdings of the portfolio arranged in a descending order of the estimated appreciation potential.

17. The method of claim 12 wherein the step of estimating comprises the step of providing to the network means input data associated with each security of the portfolio, which input data comprises: a set of fundamental financial characteristics for the security, a sequence of price returns for the security sampled at a second limited period of time, and a sequence of price returns of the index associated with the capital market sampled at the second limited period of time.

18. A system comprising one or more computers for selecting a portfolio of securities which is expected to provide, within a predetermined period of time, a return superior to the risk-adjusted performance of a selected market index, comprising:
   a plurality of predictive neural networks for estimating an appreciation potential of participating securities of a capital market over the period of time, wherein each of the neural networks is estimating the appreciation potential of a separate individual security of the participating securities, wherein each of the neural networks has been trained using data relating to a corresponding security so as to adjust weights of each of the neural networks;

at least one input data preprocessor for generating data for each of the plurality of the neural networks, comprising:

first means for receiving for each of the participating securities of the capital market current and historical trading information;

second means for receiving for each of the participating securities of the capital market fundamental information about the security, such fundamental information comprising earnings related data; and at least one processor for constructing for each of the participating securities of the capital market a set of input data sequences generated from the capital market current and historical trade information and fundamental information, said data sequences being supplied to the the plurality of predictive neural networks for forming an estimate of the appreciation potential of each security over the predetermined period of time, wherein each of the neural networks estimates the appreciation potential of a separate individual security of the participating securities.

19. The input data preprocessor of claim 18 further comprising means for receiving index information related to the return of the capital market and second storage means for storing said input data sequences.

20. The input data preprocessor of claim 19 wherein at least one data sequence includes values related to the BETA parameter associated with the corresponding security.

21. The input data preprocessor of claim 20 wherein at least one data sequence includes values related to the ALPHA parameter associated with the corresponding security.

22. The input data preprocessor of claim 20 further comprising means for estimating for each security of the capital market the correlation between each input data sequence and the investment return of the corresponding security.

23. A method for computerized selection of a portfolio of securities expected to provide, within a predetermined period of time, a return superior to the risk-adjusted performance of a select market index, comprising the steps of:

for each participating security of a capital market, electronically acquiring fundamental and price related information;

electronically analyzing the acquired information for each participating security using a separate predictive neural network which has been trained using data relating to a corresponding security so as to adjust weights of the neural network, to estimate the appreciation potential of each participating security relative to the select market index; and selecting an investment portfolio on the basis of the estimated appreciation potentials for the participating securities of the capital market such that the expected return on the selected investment portfolio is superior to the performance of the select market index.

* * * * *